(12) United States Patent
Jaworski

(10) Patent No.: US 6,349,168 B1
(45) Date of Patent: Feb. 19, 2002

(54) ELECTRIC FUMIGATION DEVICE

(75) Inventor: Thomas Jaworski, Racine, WI (US)

(73) Assignee: S. C. Johnson & Son, Inc., Racine, WI (US)

( * ) Notice: Subject to any disclaimer, the term of this patent is extended or adjusted under 35 U.S.C. 154(b) by 0 days.

(21) Appl. No.: 09/919,215

(22) Filed: Jul. 31, 2001

(51) Int. Cl.[7] ................... A61M 16/00; A01M 13/00
(52) U.S. Cl. .................. 392/392; 392/390; 43/125
(58) Field of Search ................... 392/386, 390, 392/391, 392, 394, 395, 403; 43/125, 129

(56) References Cited

U.S. PATENT DOCUMENTS

| | | | | |
|---|---|---|---|---|
| 4,163,038 A | * | 7/1979 | Nishimura et al. | ......... 392/390 |
| 4,731,522 A | * | 3/1988 | Manchester | ................. 392/390 |
| 4,804,821 A | * | 2/1989 | Glucksman | ................. 392/390 |
| 5,991,507 A | * | 11/1999 | Bencsits | .................... 392/395 |

* cited by examiner

*Primary Examiner*—Sang Paik

(57) ABSTRACT

A rotatable electric fumigation device includes an outer housing encasing a canister that contains a heat-activatable fumigant. A heating assembly, including electrical plugs fixedly attached to an electrical heater, extends partially into the housing to deliver heat to the canister and activate the fumigant. The housing is rotatable with respect to the electrical plugs and the heater to selectively position the orientation of the housing, thereby rendering the fumigation device operable regardless of the orientation of the electrical outlet.

9 Claims, 5 Drawing Sheets

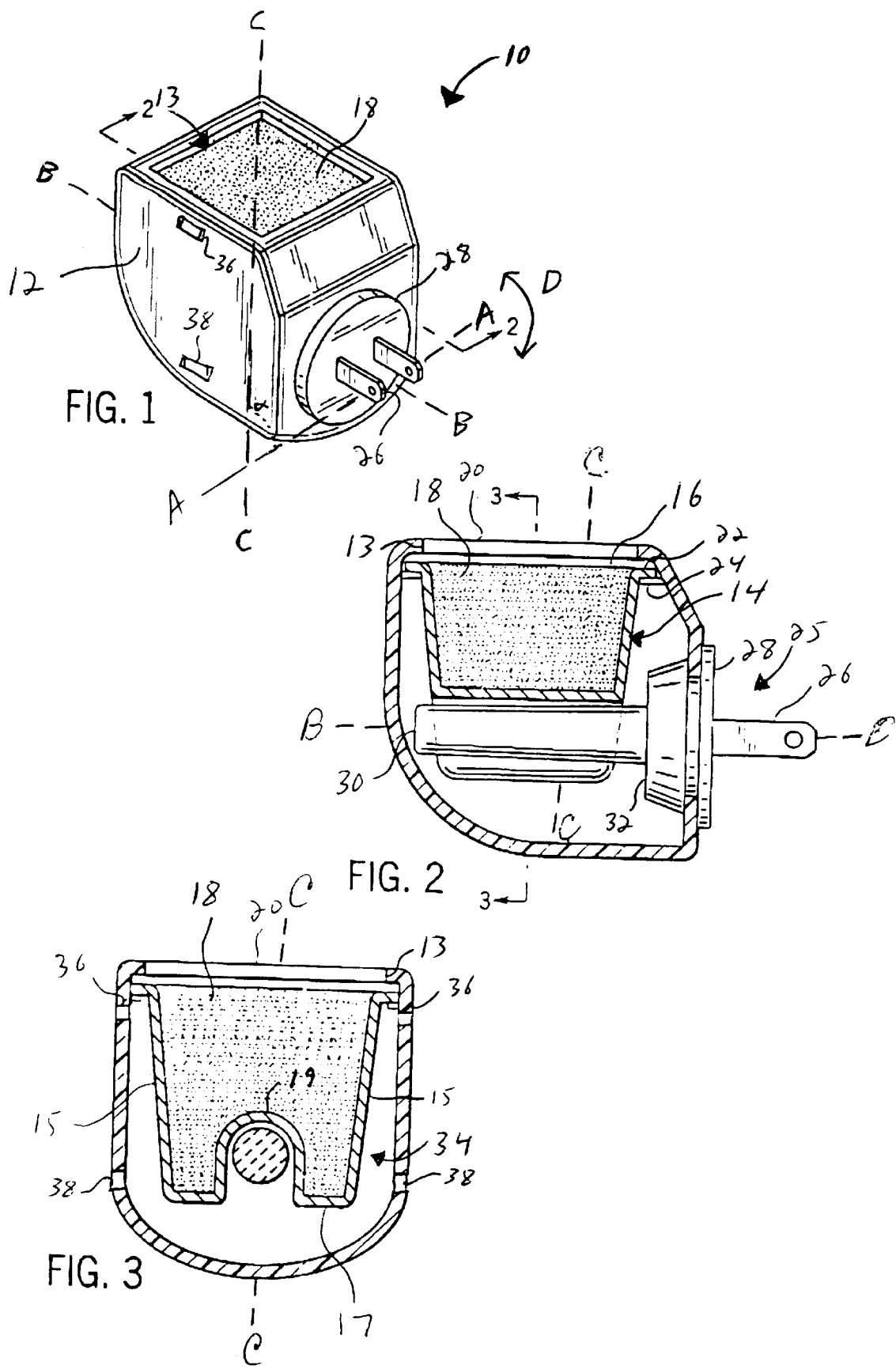

ELECTRIC FUMIGATION DEVICE

CROSS-REFERENCE TO RELATED APPLICATIONS

Not applicable

STATEMENT REGARDING FEDERALLY SPONSORED RESEARCH/DEVELOPMENT

Not applicable

BACKGROUND OF THE INVENTION

The present invention relates to wall mountable electrically activated fumigation devices. It appears to be especially well suited for use in permitting such devices to be compatible with electric sockets having varied alignments relative to the wall.

Devices are known for fumigating an enclosed area, such as a room in a house, by expelling a fumigant (e.g. typically an insecticide or fragrance) upon an application of heat. As disclosed in U.S. Pat. No. 5,796,914, some of these devices include a disposable canister containing the fumigant, and an electric heater positioned under the fumigant. When activated the device produces a fog that is expelled out to fumigate a room or the like.

Before the application of heat the fumigant typically is in a solid form. It subsequently transforms into a viscous gel material in response to the initial introduction of heat. As a result, it is desirable to direct the mouths of such devices at least partially upwardly to prevent the gel from spilling. While further heating will produce the fog, during the gel phase there is a spilling potential.

Further complicating matters, on a vertical wall blade sockets can be side by side, or alternatively one over the other. One previous fumigation device includes a canister/housing assembly whose orientation is fixed with respect to the electrical plug. As a result, the mouth of the canister faces vertically upwardly when the plug is inserted in side by side blade holes, but horizontally when the blade holes are one on top of the other. Thus, this system is not compatible with the latter type of blade hole configuration.

U.S. Pat. No. 5,796,914 provided an improved device having a plug mounted on an angle with respect to the housing, thus allowing the mouth to be positioned at least somewhat upwardly (regardless of the orientation of the electrical outlet). One potential disadvantage of this device is that the orientation of the mouth of the canister is fixed with respect to the electrical plugs. This limits the level of fumigant in the canister to some extent, as well as restricts the angle that the outlet may be pointed at.

A need still exists for greater flexibility in the structures used to mount such electric fumigation devices on walls.

BRIEF SUMMARY OF THE INVENTION

In one aspect the invention provides an electric fumigation device. It has a housing including a delivery port, a canister disposed within the housing and defining a cavity having a mouth in communication with the delivery port, the cavity containing a heat-activatable fumigant, and a heating assembly.

The heater has an electrical plug extending outwardly from the housing configured to be received by an electrical outlet. There is a heating device disposed in the housing and extending along a longitudinal axis. The heating device is in electrical communication with the electrical plug and in thermal communication with the canister. The housing is rotatable about the longitudinal axis around the heating assembly.

In preferred forms, the heating device extends at least partially between walls of the canister, the electrical plug defines a lateral axis, and the housing extends along an axis that is at an adjustable angle with respect to the lateral axis. The adjustable angle can preferably be between 0 and 90 degrees.

The canister rotates along with the housing with respect to the heating assembly (about the longitudinal axis of the heating assembly). The canister can extend essentially perpendicularly with respect to the longitudinal axis, or it can extend along the axis, and/or an outlet portion thereof can extend at an angle.

In other preferred forms there is an air gap disposed between the canister and housing, and a vent formed in the housing in fluid communication with the air gap.

In another aspect the invention provides a method of fumigating an area in which an electrical receptacle is mounted on a wall with a fumigating active ingredient. One provides an electrically activatable device of the above kind. One then plugs the fumigating device into the electrical receptacle and allows electricity from the electrical receptacle to cause a release of the active ingredient.

The present invention thus achieves mounting flexibility by fixing the heater core and plug with respect to the wall. It allows the canister and housing to rotate around the core as needed. Because the housing and canister are preferably not linked by wiring to the heater, there is no risk of wiring becoming tangled due to the rotation. Further, because the connection between the housing and heater is a frictioned connection, once the rotational position of the housing and canister are adjusted by the consumer, it will stay fixed during use.

Placing the heater between canister walls insures better thermal transfer, renders the design more compact, and reduces excess heat reaching the outer housing. This can be achieved by placing the heater between legs of the canister, or by inserting the heater in a donut hole tube of the canister.

The foregoing and other advantages of the invention will appear from the following description. In the description, reference is made to the accompanying drawings which form a part thereof, and in which there is shown by way of illustration, and not limitation, preferred embodiments of the invention. Such embodiments do not necessarily represent the full scope of the invention. Reference must therefore be made to the claims herein for interpreting the scope of the invention.

BRIEF DESCRIPTION OF THE DRAWINGS

FIG. 1 is a perspective view of an electrical fumigation device of the present invention;

FIG. 2 is a sectional view taken along line 2—2 of FIG. 1;

FIG. 3 is a sectional view taken along line 3—3 of FIG. 2;

DETAILED DESCRIPTION OF THE PREFERRED EMBODIMENT

Figure 4:
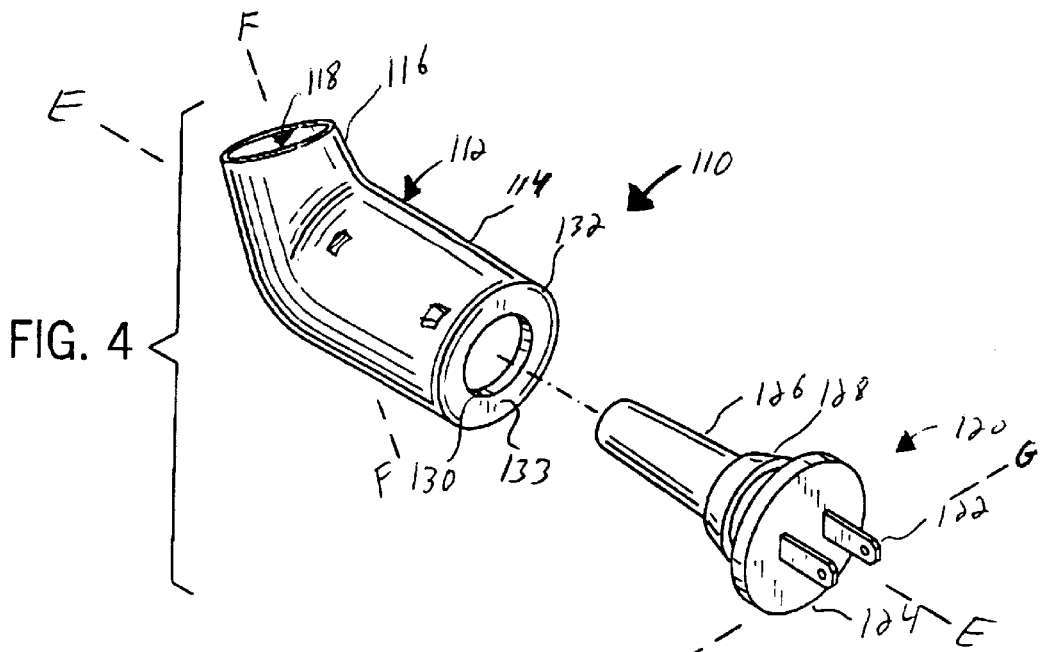
FIG. 4 is an exploded perspective view of a electrical fumigation device constructed in accordance with an alternate embodiment of the invention.

Referring initially to FIGS. 1–3, an electrically activated fumigation device 10 includes a housing 12 defining an enclosure having a delivery port in the form of opening 13. The delivery port allows activated fumigant to escape from device 10 and into the ambient environment that is to be fumigated. Housing 12 may be unitarily molded of heat-resistant plastic or ceramic material.

A canister 14 (which may be integrated within housing 12, or preferably separately form) is disposed within the housing 12. It defines an open volume containing a heat-activatable chemical charge 18. The canister has a mouth 16 disposed at its outer end. The chemical charge 18 preferably includes an active fumigation ingredient and blowing agent for expelling activated fumigant from the cavity 14 by a self-sustaining chemical reaction. The blowing agent may combustor, preferably, be a heat-activatable but non-combusting blowing agent, such as azodicarbonamide.

The fumigant is preferably an insecticide such as permethrin mixed with azodicarbonamide, starch and a fragrance. However, a wide variety of other synthetic and naturally occurring insecticides would also work. In addition, antibacterial and air freshening products may be used, as may other blowing agents. The preferred form of the pellets is cylindrical, but granulated or spherical forms are also possible.

A cover 20 occupies the opening 13 during storage, and thus effectively encloses the canister 14, whose mouth 16 is aligned with opening 13. The cover preferably made of a material sufficiently impervious to water and atmospheric gases so as to be able to protect the chemical charge 18 during storage. The cover 20 is openable by the blowing agent to release the fumigant at the container mouth 16. In particular, the cover may burst, melt, or otherwise open to facilitate the release of fumigant in response to the temperature or pressure generated by the blowing agent. Alternatively, it may be a peal off closure.

The fumigation device 10 further includes an electrical connector in the form of a plug 26 that is mounted on an annular base 28. The electrical plug 22 is configured to be plugged into a conventional electrical outlet, regardless of orientation (not shown). The two prongs of the electrical plug define a lateral axis A—A.

An annular heating device 30 extends along a longitudinal axis B—B within the housing 12 (in the FIG. 2 embodiment) and below canister 14. Canister 14 and housing 12 extend along an axis C—C that, as illustrated in FIG. 1, defines a 90° angle with respect to lateral axis A—A. However, as will be described in more detail below, canister 14 and housing 12 are rotatable about axis B—B, thereby permitting adjustment of the angle. In this embodiment, the activated fumigant exits device 10 generally along axis C—C.

Heating device 30 extends longitudinally from a wall 32 that is fixedly attached to wall 28 via a hub that extends through an internal bore (not shown) in a side wall of housing 12. The base 28 and 32 effectively sandwich the side wall of housing 12. Because base 28 and wall 32 are connected via the hub, the position of heating device is fixed with respect to the electrical plug 26. The plug 26 is wired to the resistance heating element 30 such that heat is produced when the plug is inserted into an electrical outlet. The combination of plug 26 and heating device 30 cumulatively form a heating assembly 25.

As illustrated in FIG. 3, canister is sufficiently deep such that its side walls 15 preferably extend below heating element 30. Canister 14 is further defined by a base 17 that extends between the side walls 15, and includes a centrally disposed arc-shaped recess 19 that extends in close proximity around the annular heating element 30. A substantial surface of base 17 is in thermal communication with the heating element 30, thus enabling the efficient heating of the chemical charge 18 that is disposed within canister 14.

Container 48 is preferably a seamless, metallic can suitable for conducting heat. The canister 14 may be held entirely within the housing 12 as is illustrated in FIGS. 1–3, or may project outwardly from the housing at the mouth 16. A pair of flanges 22 extend outwardly from proximal the radially outer end of opposing side walls 15 into a corresponding pair of catches 24 that are formed on the inner surface of housing 12. In particular, each catch comprises a flange that extends inwardly from housing 12, and provides a seat for flange 22. A beveled wall of the housing 12 rests against the outer surface of one of the flanges 22, thereby preventing significant movement of the canister 14 during operation. Furthermore, because the canister may not be removed from the housing 12 without the effective destruction of the fumigation device 10, it is assured that the fumigation device 10 can only used once.

The housing 12 and canister 14 are rotatable with respect to heating assembly 25, thereby allowing the electrical plug 26 to be plugged into any standard electrical outlet in any orientation, while ensuring that thereafter the canister can be rotated to extend vertically. As a result, the chemical charge 18 may occupy the entire volume within canister 14 because when extending directly vertically, the risk of chemical spillage is eliminated. On the other hand, it may be desirable to position the canister on an angle with respect to the vertical direction in some applications in order to expel the produced fog in a desired direction.

Rotating the cavity from the vertical direction further reduces the exposure of any wall above the device 10 to directly projected fumigant, and is more likely to direct fumigant towards the center of the space to be treated, resulting in a more uniform distribution throughout that space of fumigant and especially of fumigating smoke. As a result, the fumigation device 10 is made useful in a wider variety of circumstances.

If device 10 is plugged into an outlet that is disposed on an upper surface of a horizontally extending wall, some of the gelled chemical charge 18 would tend to spill from the canister 14. This spillage could be alleviated, however, by covering mouth 16 directly with a barrier (not shown) that is sufficient to retain the gel in the canister while permitting the flow of the produced fog. For example, the barrier could be a wire screen or mesh having holes sufficiently small and close together to prevent the gel from flowing through, but large enough to enable the passage of the fog.

The electrical assembly 25 and heating assembly 29 are connected so as to provide frictional forces with respect to the housing 12. This may be accomplished by using a hub having a length that is sufficient to space the inner surfaces of bases 28 and 32 at a distance apart that is substantially equal to the thickness of the wall of housing 12. Alternatively, or additionally, the hub may have a diameter substantially equal to the diameter of the bore extending through the housing. Accordingly, the frictional forces that exist between the heating assembly 25 and housing 12 are sufficient to resist relative rotation during normal operation of the fumigation device 10.

Under typical circumstances, the electrical outlet will receive the electrical plugs 26 on a vertical wall in either a vertical or horizontal orientation. As illustrated in FIG. 1, the electrical plug 26 is configured to be plugged into an electrical outlet to result in a horizontal orientation, such that axis C—C forms a 90° angle with respect to the lateral axis A—A. If the electrical outlet has in a different orientation, then the housing 12 is rotated with respect to the electrical plug 26 in either direction as indicated by arrow D.

During operation of the fumigation device 10, heat is generated from both operation of the heating element 30 as well as the reaction of the blowing agent in the chemical charge 18. As a result, the housing 12 must be capable of withstanding that heat and retaining its structural integrity. In order to reduce the amount and intensity of the heat that is experienced by the housing 12, the canister 14 is disposed inwardly with respect to the housing to define an insulating air gap 34 disposed therebetween. A pair of heating vents 36 may further extend through opposing side walls of housing 12 proximal their radially outer ends to replace heated air from the insulating air space 34 with cooler air from the ambient environment. Housing 12 may further include a second pair of vents, that extend through opposite side walls proximal their radially inner ends and that also release heated air into the atmosphere to maintain the housing 12 at a reasonable temperature.

Preferably, the heating element 30 is non-renewably self-disabling after heating sufficiently to initiate the action of the blowing agent. Accordingly, use of the fumigation device 10 subsequent to the activation of the blowing agent is prevented. In particular, the heating element 30 is preferably destroyed non-renewably upon its first use, thereby requiring that the fumigation device 10 be a single use device.

The preferred heating device 30 implemented in accordance with the preferred embodiment is a resistance heater designed to break or otherwise become discontinuous after heating to a select temperature, thereby interrupting the flow of electricity through the fumigation device 10. Various resistance heaters are known to those skilled in the art, including heaters utilizing a loop or wound coil of resistance wire. See generally U.S. Pat. No. 5,786,914.

Figure 7:
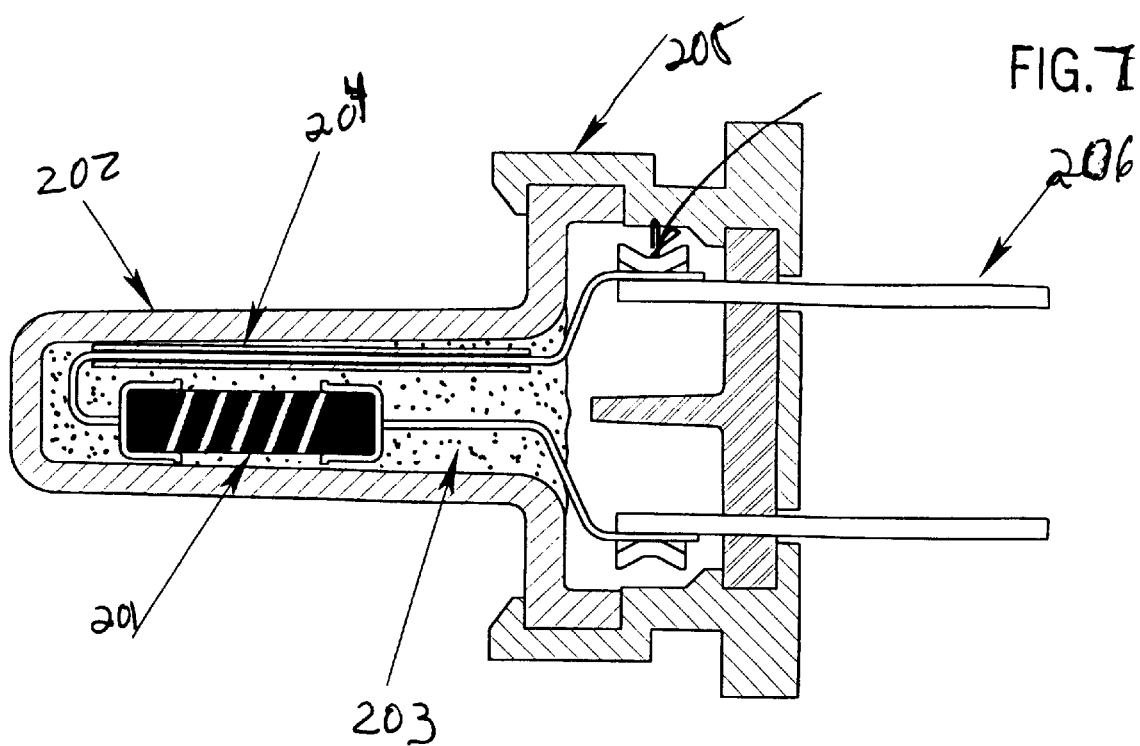
FIG. 7 is a detailed vertical cross sectional view of a preferred form of heater assembly.
Figure 8:
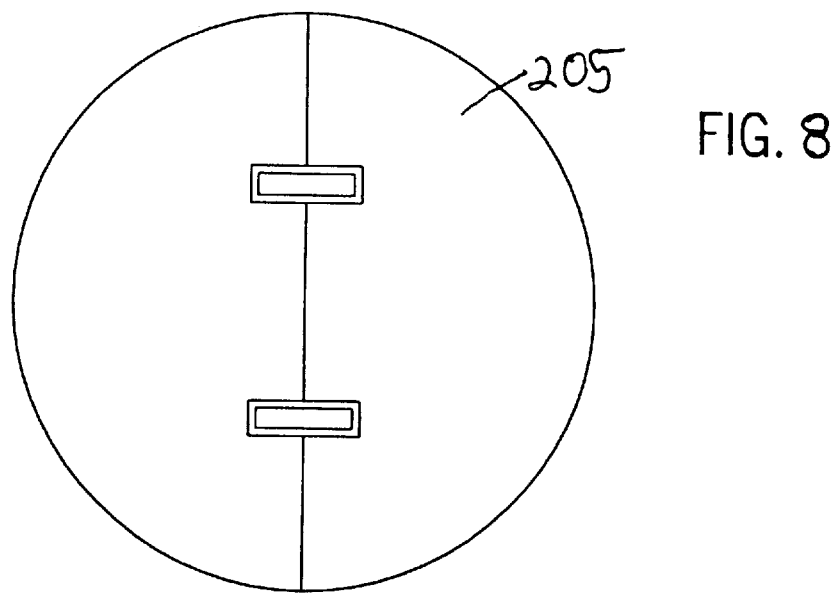
FIG. 8 is a rear end view thereof.

FIG. 7 depicts an alternative form of preferred heater. There is a metal film or metal oxide resistor 201 which is potted into an electrically insulated ceramic housing or sheath 202. The potting compound 203 secures the resistor 201 in the sheath, provides electrical insulation, and also thermal conduction. One lead of the resistor is sleeved at 204 to isolate it from the opposite lead. This isolation can be accomplished via a rib within the ceramic sheath or other techniques. The sheath is mounted in a base 205 that houses the usual plug 206. As noted in FIG. 8, this construction can be assembled using a two-piece clam shell base.

The resistor is designed to provide at least 250° C. for at least 30 seconds. It operates over expected line voltages of 120 volts, plus or minus 10%. A resistor with a value of 600 ohms plus or minus 5% is manufactured by Royal Electric Fty., Co., Ltd.

Figure 9:
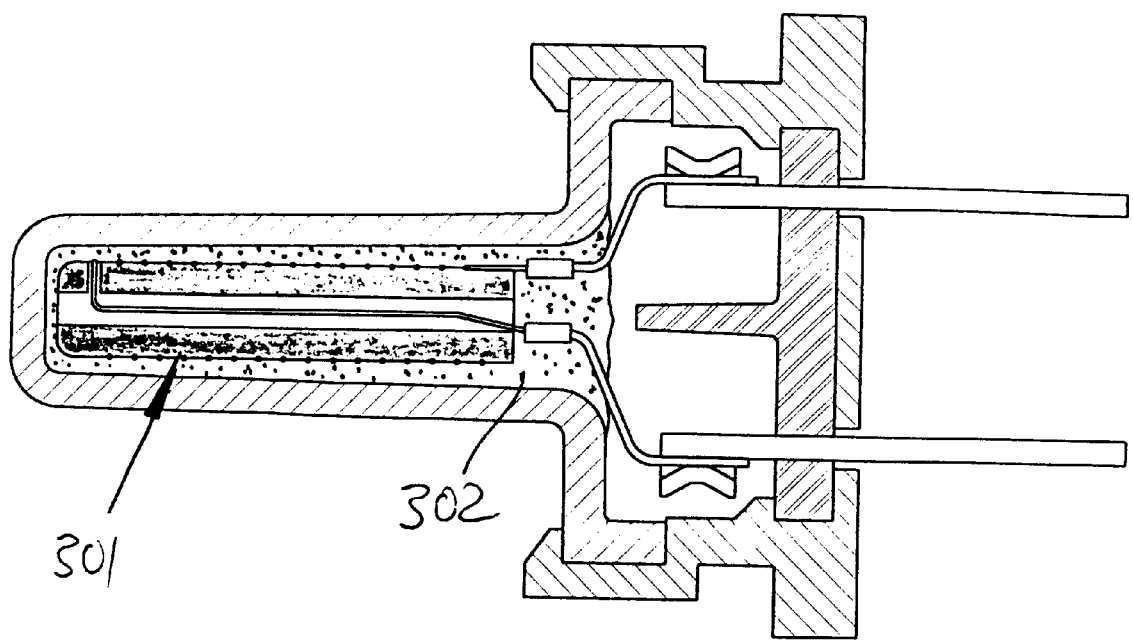
FIG. 9 is a view similar to FIG. 7, but of an alternative form of heater assembly.

FIG. 9 depicts an alternative construction where a resistance wire is coiled around a ceramic core 301, which is in turn mounted with potting compound 302. Still other heater constructions will work as well.

Figure 5:
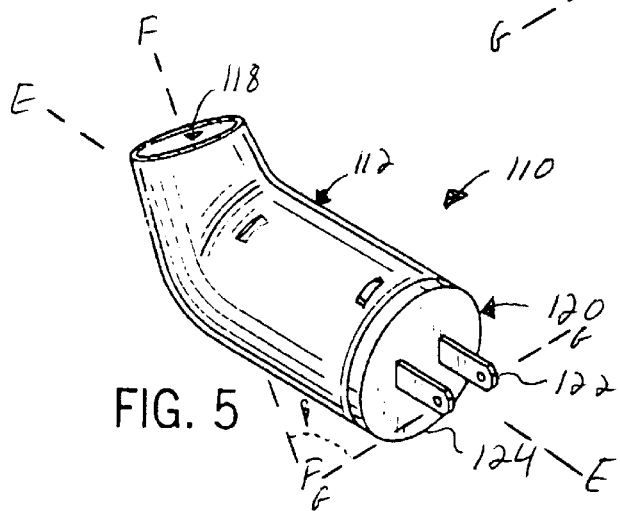
FIG. 5 is a perspective view of the FIG. 4 device.
Figure 6:
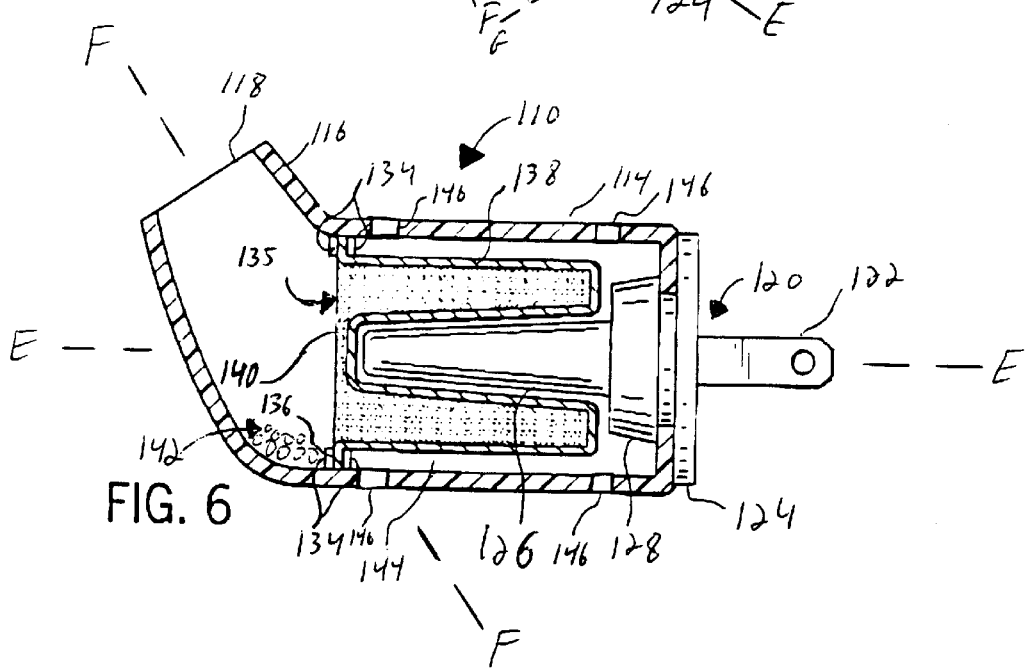
FIG. 6 is a vertical cross section view of the FIG. 5 device.

Referring now to FIGS. 4–6, an alternative fumigation device 110 includes annular housing 112 having a laterally extending annular portion 114 that extends along a longitudinal axis E—E. Lateral portion 114 is integrally connected at one end to a radial portion 116 that extends both axially and radially outwardly along an axis F—F, whose orientation is adjustable about longitudinal axis E—E. Radial portion 116 includes an opening 118 at its outer end for the exhaust of the fumigant as will become more apparent from the description below.

Referring in particular to FIG. 6, an annular canister 138 extends longitudinally within member 114 along axis E—E, and includes an annular flange 136 extending radially outwardly from its outer end. A corresponding pair of annular flanges 134 extend radially inwardly from the outer end of member 114 and are sufficiently spaced so as to define a catch that receives flange 136 therein. Accordingly, as described above, the canister 138 may not be removed without the effective destruction of the fumigation device 110. Canister 138 contains a chemical charge 140 that comprises a fumigant and a blowing agent responsive to heat, as described above. In accordance with this embodiment, the activated fumigant escapes the fumigation device 110 out the opening (or delivery port) 118 along axis F—F, which is offset from axis E—E, the direction of extension of canister 138.

A heating assembly 120 includes an electrical plug 122 that is secured to a base 124 member. Assembly 120 further includes a heating device 126 that is connected to a base member 128 that, in turn, is fixedly connected to base 124 via a hub (not shown), as described above. An annular flange 133 extends radially inwardly from the outer end of member 114, and defines a bore 130 sized to receive the hub such that flange 133 is effectively sandwiched between base members 124 and 128. Accordingly, the electrical plug 122 extends axially outwardly from flange 133, and heating device 126 extends axially inwardly with respect to flange 133. The heating device 126 is activatable by electricity delivered thereto via the electrical plug 122 during operation. As described above, sufficient friction exists between heating assembly 120 and housing 112 to prevent rotation there between due to gravitational forces during operation. An alternative technique for limiting rotation is described below and depicted in FIGS. 10 and 11.

Heating device 126 extends almost the entire length of member 114, and is centrally disposed with respect to canister 138, whose radially inner annular wall extends around heating device 126 in close proximity. Because the canister 138 comprises a heat-conductive material and a large surface area is presented that is heated directly by heating element 126, the chemical charge 140 is thus heated more efficiently and uniformly with respect to the embodiment illustrated in FIGS. 1–3.

The fumigation device 110 constructed in accordance with this embodiment may be plugged into an electrical outlet so as to extend either vertically or horizontally with respect to the outlet. In particular, when axis E—E extends vertically, housing 112 (and optionally the canister) may be rotated to any desired position so as to direct the fumigant both upwardly and outwardly from the mounting surface. When in this orientation, there is no risk of the chemical charge spilling from the device 110 regardless of the orientation of opening 118. When axis E—E extends horizontally from the mounting surface, the angular orientation of opening 118 may again be adjusted to its desired position, but should extend at least partially upwardly to ensure that any chemical charge escaping from canister 138 will stay within the fumigation device 110. Advantageously, the fumigation device 10 may thus be plugged into an outlet that is disposed on a vertically extending mounting surface, or on the upper surface of a horizontally extending mounting surface without risking spillage of the gelled chemical charge from the device during operation.

In particular, the interface between radially extending section 116 and axially extending section 114 defines an internal well 142 that will retain any liquified chemical charge that escapes from canister 138 when opening 118 faces upwardly. It is appreciated that the inner diameter at the interface between sections 114 and 116 is greater than the inner diameter at opening 118 such that spillage of the chemical charge within the housing 112 will not impede the flow of fumigant from exiting through the opening 118.

As described above, the mouth 135 may additionally be covered with a barrier (not shown) that is sufficient to retain the gel in the canister while permitting the flow of the produced fog. For example, the barrier could be a screen or mesh having holes sufficiently small and close together to prevent the gel from spilling into the well 142, but large enough to enable the passage of the fog. The mouth 135 is in fluid communication with the opening 118 as the fog is able to flow from the mouth 135 to the opening 118.

As described above, fumigation device 110 includes an insulating air gap disposed between the outer surface of canister 138 and the inner surface of housing 112 so as to prevent the overheating of the housing. As an additional measure, two pair of oppositely disposed vents 146 may extend through annular member 114 at opposite ends thereof to replace the heated internal air with cooler ambient air.

Figure 10:
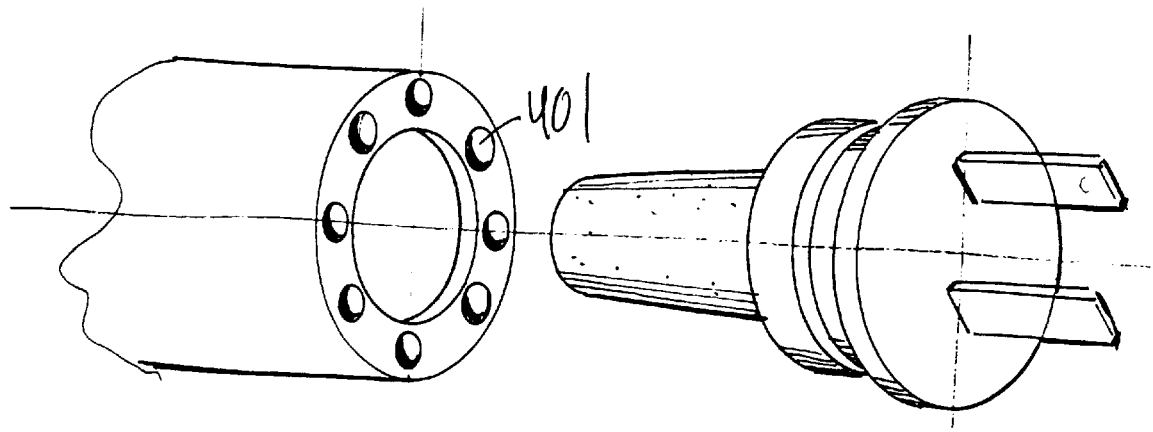
FIG. 10 is an exploded perspective view of an alternative end of the FIG. 5 housing and heater assembly.
Figure 11:
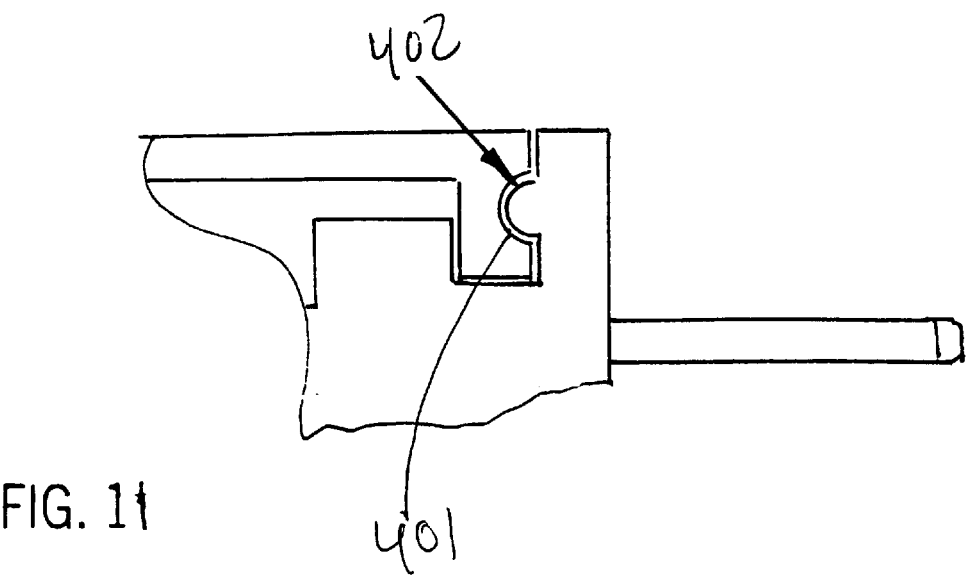
FIG. 11 is a partial sectional view showing the connection between the plug and housing.

As depicted in FIGS. 10 and 11 flange 133 could alternatively be provided with a series of circular depressions 401 to provide a detent connection with a projection 402 on the plug base. This will provide positive positioning at defined angles for the housing 110, while permitting rotation between the plug 120 and housing 110 when desired.

To use the device one plugs it into an electrical outlet, and selects the desired orientation of the mouth such that the fumigant is directed at least partially upwardly, and then allows electricity from the electrical outlet to activate the heating mechanism, first to initiate the action of the blowing agent to release the active ingredient at the well mouth, and second to non-renewably self-disable the fumigation device, preventing its subsequent use.

The invention has been described in connection with what are presently considered to be the most practical and preferred embodiments. However, the present invention has been presented by way of illustration and is not intended to be limited to the disclosed embodiments. Accordingly, those skilled in the art will realize that the invention is intended to encompass all modifications and alternative arrangements included within the spirit and scope of the invention, as set forth by the appended claims.

Industrial Applicability

The present invention provides an electric fumigator that is adjustable to direct fumigant in a desired direction regardless of the orientation of the electrical outlet.

What is claimed is:

1. An electric fumigation device, comprising:
   a housing including a delivery port;
   a canister disposed within the housing and defining a cavity having a mouth in communication with the delivery port, the cavity containing a heat-activatable fumigant; and
   a heating assembly having:
      an electrical plug extending outwardly from the housing and configured to be received by an electrical outlet; and
      a heating device disposed in the housing and extending along a longitudinal axis, whereby the heating device is in electrical communication with the electrical plug and in thermal communication with the canister;
   wherein the housing is rotatable about the longitudinal axis around the heating assembly.

2. The fumigation device as recited in claim 1, wherein the heating device extends at least partially between walls of the canister.

3. The fumigation device as recited in claim 1, wherein the electrical plug defines a lateral axis, and wherein the housing extends along an axis that is at an adjustable angle with respect to the lateral axis.

4. The fumigation device as recited in claim 2, wherein the adjustable angle is between 0 and 90 degrees.

5. The fumigation device as recited in claim 1, wherein the canister rotates along with the housing about the longitudinal axis of the heating assembly.

6. The fumigation device as recited in claim 1, wherein the canister extends essentially perpendicularly with respect to the longitudinal axis.

7. The fumigation device as recited in claim 1, further comprising an air gap disposed between the canister and housing.

8. The fumigation device as recited in claim 7, further comprising a vent formed in the housing in fluid communication with the air gap.

9. A method of fumigating an area in which an electrical receptacle is mounted on a wall with a fumigating active ingredient, the method comprising the steps of:
   providing an electrically activatable device of claim 1;
   plugging the fumigating device into the electrical receptacle; and
   allowing electricity from the electrical receptacle to cause a release of the active ingredient.

* * * * *